United States Patent
Mills, Jr. et al.

(10) Patent No.: US 6,537,747 B1
(45) Date of Patent: Mar. 25, 2003

(54) DATA TRANSMISSION USING DNA OLIGOMERS

(75) Inventors: Allen P. Mills, Jr., Chatham, NJ (US); Bernard Yurke, Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/238,888

(22) Filed: Jan. 28, 1999

Related U.S. Application Data

(63) Continuation-in-part of application No. 09/018,248, filed on Feb. 3, 1998, which is a continuation-in-part of application No. 09/078,761, filed on May 15, 1998, which is a continuation-in-part of application No. 09/129,958, filed on Aug. 6, 1998.

(51) Int. Cl.$^7$ .............................. C12Q 1/68; H04L 9/00; H04N 7/167

(52) U.S. Cl. ..................... 435/6; 435/91.2; 536/23.1; 702/19; 702/20; 380/4; 380/5; 380/14; 380/28

(58) Field of Search ................... 435/6, 91.2; 536/23.1; 702/19, 20; 380/14, 28, 4, 5

(56) References Cited

U.S. PATENT DOCUMENTS

| | | |
|---|---|---|
| 5,176,996 A | 1/1993 | Hogan et al. |
| 5,398,283 A | 3/1995 | Virga |
| 5,412,087 A | 5/1995 | McGall et al. |
| 5,445,934 A | 8/1995 | Fodor et al. |
| 5,475,096 A | 12/1995 | Gold et al. |
| 5,503,980 A | 4/1996 | Cantor |
| 5,533,127 A | 7/1996 | Luther |
| 5,605,662 A | 2/1997 | Heller et al. |
| 5,648,211 A | 7/1997 | Fraiser et al. |
| 5,814,454 A | 9/1998 | Ju |
| 6,312,911 B1 * | 11/2001 | Bancroft et al. ............... 435/6 |

FOREIGN PATENT DOCUMENTS

WO    WO 00/68431    * 11/2000

OTHER PUBLICATIONS

Hodgson, Clague, "A DNA text code", Biotechniques 9(3):312 (1990).*
Darnell et al, Molecular Cell Biology (1986) 108–118.*
Wrixon, Fred B., "Codes and Ciphers," Prentice Hall, New York, New York, pp. xi–xii, 29–30, 34–35; 1992.
Berent et al., *BioTechniques*, May/Jun., pp. 208–220, 1985.
Sambrook, J. et al., "Molecular Cloning, A Laboratory Manual," *Synthetic Oligonucleotide Probes*, Cold Spring Harbor Laboratory Press, pp. 11.2–11.19, 11.45–11.49, and 11.52–1.61, 1989.
Saiki, Randall K., The Design and Optimization of the PCR, *PCR Technology*, Stockton Press, pp. 7–16, 1989.
Milner, Natalie et al., *Nature Biotechnology*, vol. 15, pp. 537–541, 1987.
Adleman, Leonard M., "Molecular Computation of Solutions to Combinatorial Problems," *Science*, vol. 266, pp. 1021–1024, 1994.
Lipton, Richard J., "DNA Solution of Hard Computational Problems," *Science*, vol. 268, pp. 542–545, 1995.
Guarnieri, Frank et al., "Making DNA Add," *Science*, vol. 273, pp. 220–223, 1996.

(List continued on next page.)

*Primary Examiner*—Jeffrey Fredman

(57) ABSTRACT

The present invention is directed to methods for (a) encrypting information in the form of words, numbers, or graphical images, by obtaining a set of nucleic acid strands or nucleic acid analog strands having subunit sequences selected to represent the information, (b) transmitting the information by sending the nucleic acids or nucleic acid analogs to a recipient who possesses a key for decryption, and (c) using the key to decrypt the information and recover the words, numbers, or represented by the nucleic acids or nucleic acid analogs.

27 Claims, 6 Drawing Sheets

OTHER PUBLICATIONS

Oliver, John S. et al., "Matrix Multiplication with DNA," *J. Mol. Evol.*, vol. 45, pp. 161–167, 1997.

McGall et al., *J. American Chem. Soc.*, vol. 119, pp. 5081–5090, 1997.

Pease, Ann Caviani et al., "Light-generated oligonucleotide arrays for rapid DNA sequence analysis," *Proc. Natl. Acad. Sci. USA*, vol. 91, pp. 5022–5026, 1994.

Ramsay, Graham, "DNA chips: State-of-the-art," *Nature Biotechnology*, vol. 16, pp. 40–44, 1998.

Marshall, Andrew et al., "DNA chips: An array of possibilities," *Nature Biotechnology*, vol. 16, pp. 27–31, 1998.

Tyagi, Sanjay et al., "Multicolor molecular beacons for allele discrimination," *Nature Biotechnology*, vol. 16, pp. 49–53, 1998.

Ross, Philip, et al., "High level multiplex genotyping by MALDI–TOF mass spectrometry," *Nature Biotechnology*, vol. 16, pp. 1347–1351, 1998.

Laken, Steven J. et al., "Genotyping by mass spectrometric analysis of short DNA fragments," *Nature Biotechnolgy* vol. 16, pp. 1352–1356, 1998.

Drmanac, R. et al., "Sequencing of megabase plus DNA by hybridization:Theory of the method," Genomics, vol. 4, pp. 114–128, 1989.

Mirkin, Chad A. et al., "A DNA–based method for rationally assembling nanoparticles into macroscopic materials," *Nature*, vol. 382, pp. 607–609, 1996.

Marmur, J. et al., "Denaturation and Renaturation of Deoxyribonucleic Acid," *Progress in Nucleic Acid Research*, vol. 1, pp. 231–300, 1963.

Britten, Roy J., "Analysis of Repeating DNA Sequences by Reassociation," *Methods In Enzymology*, vol. 19, Part E, No. 3841, pp. 363–418, 1974.

Wetmur, James G. et al., Kinetics of Renaturation of DNA, *J. Mol. Biol.*, 31, pp. 349–370, 1968.

Britten R.J. et al., "Repeated Sequences in DNA," *Science*, vol. 161, No. 3841, pp. 529–540, 1968.

Kamins, Ted, "Polycrystalline Silicon For Integrated Circuit Applications," Kluwer Academic Publishers, Boston, MA, pp. vii–xii, 156–175, 1996.

Drmanac, Snezana et al., "Accurate sequencing by hybridization for DNA diagnostics and individual genomics," *Nature Biotechnology*, vol. 16, pp. 54–58, 1998.

* cited by examiner

DATA TRANSMISSION USING DNA OLIGOMERS

CROSS-REFERENCES TO RELATED APPLICATIONS

This application is a continuation-in-part of U.S. application Ser. No. 09/018,248 filed Feb. 3, 1998; this application is also a continuation-in-part of U.S. application Ser. No. 09/078,761 filed May 15, 1998; and this application is a continuation-in-part of U.S. application Ser. No. 09/129,958 filed Aug. 6, 1998.

FIELD OF THE INVENTION

This invention relates to cryptology, which is the science of encrypting and decrypting messages, to steganography, which is the concealment of the presence of secret messages, and also to nucleic acid chemistry and molecular biology. In particular, the invention relates to (a) encrypting information in the form of words, numeric data, or graphical images, by obtaining a set of nucleic acid strands or nucleic acid analog strands having subunit sequences selected to represent the information, so that the information cannot be decrypted by anyone not in possession of a key for decryption, (b) transmitting the set of nucleic acid strands or nucleic acid analog strands to a recipient who possesses a key for decryption, and (c) decrypting the information by using the key to recover the words, numeric data, or graphical images, represented by the nucleic acid strands or nucleic acid analog strands.

BACKGROUND OF THE INVENTION

All publications, patents, and patent applications cited herein are incorporated by reference, fully as if each individual publication, patent, or patent application was specifically and individually indicated to be incorporated by reference.

Over the centuries, many different methods have been developed to send messages or other information in a form that cannot be understood by anyone other than the intended recipient. Such methods have typically involved encrypting the information by replacing the letters or numbers, words, or phrases of the message with other letters and/or numbers. Decryption of the information is achieved through use of a key which may include instructions and other information, special materials, and a device, and which enables the recipient to recover the original message or information from the encrypted communication (Fred B. Wrixon, *Codes and Ciphers*, Prentice Hall, New York, N.Y., 1992).

Today, computers and other electronic devices are used to encrypt, transmit, and decrypt private communications. For example, an optical scanner can be used to digitize a graphical image. The two-dimensional matrix of digital values that defines the image can be encrypted, electrical signals representing the encrypted image can be transmitted over a communications link, and the recipient can use a decryption key to recover the digitized image (see Virga, U.S. Pat. No. 5,398,283; and Luther, U.S. Pat. No. 5,533,127).

Oligonucleotides and oligonucleotide analogs of defined sequence and length are currently used in many different molecular biological, biochemical, diagnostic, and computational applications. For example, they are used as hybridization probes to detect specific nucleic acid sequences in DNA and RNA samples immobilized on a variety of filter and solid supports, as in DNA and RNA Dot, Southern, and Northern blots, and in colony and plaque hybridization assays. These methodologies are widely used in the isolation and cloning of specific nucleic acids, and the diagnosis of disease caused by pathogens and genetic mutations (Berent et al., BioTechniques, issue of May/June 1985, pages 208–20; and J. Sambrook, E. F. Fritsch, and T. Maniatis, *Molecular Cloning, A Laboratory Manual*, Cold Spring Harbor Laboratory Press, Cold Spring Harbor, N.Y., 1989, Chapter 11).

Sets of oligonucleotides of defined sequence are also used as primers for polymerases in polynucleotide synthesis and in nucleic acid amplification, for example, by the polymerase chain reaction (PCR, Erlich, *PCR Technology, Principles and Applications for DNA Amplification*, Stockton Press, New York, N.Y., 1989, in entirety), or by strand displacement amplification (SDA, Fraiser et al., U.S. Pat. No. 5,648,211, col. 3–18).

Oligonucleotides of defined sequence are also used as probes of macromolecular structure and function; for example, antisense and triplex-forming oligonucleotides can be screened to identify oligomers which bind specifically to an accessible portion of a native target nucleic acid such as a folded mRNA molecule, and which inhibit transcription or translation of a specific mRNA (see, for example, Milner et al., Nature Biotechnology, 1987, Vol. 15, pages 537–41; and Hogan et al., U.S. Pat. No. 5,176,996, in entirety).

Various strategies for finding solutions to mathematical problems have been devised which use sets of oligonucleotides having selected length and sequence properties to represent elements of the problems. DNA oligonucleotides representing vertices or edges of a graph have been used to solve a Hamiltonian path problem (Adleman, Science, 1994, Vol. 266, pages 1021–3) and a "satisfaction" problem (Lipton, Science, 1995, Vol. 268, pages 542–5); oligonucleotides representing non-negative binary numbers have been used for performing addition (Guarnieri et al., Science, 1996, Vol. 273, pages 220–223); and oligonucleotides representing products of matrix elements have been used for performing matrix multiplication (Oliver, J. Molecular Evolution, 1997, Vol. 45, pages 161–7).

Recently, oligonucleotides have been immobilized or synthesized in micro-arrays on solid supports of material such as glass or $SiO_2$. "DNA chips" produced in this manner are useful for detecting or capturing multiple nucleic acid targets, for determining the nucleic type sequence of a target nucleic acid, for simultaneous analysis of the expression of thousands of genes, large scale gene discovery, DNA polymorphism screening, and mapping of genomic DNA clones, and are well suited for use in medical diagnostic assays for detection of pathogen infection and genetic mutation (for example, see Fodor et al., U.S. Pat. No. 5,445,934, col. 3–21, 23–32; McGall et al., U.S. Pat. No. 5,412,087, col. 4–20; Cantor, U.S. Pat. No. 5,503,980, col. 4–20; Heller et al., U.S. Pat. No. 5,605,662, col. 9–32; McGall et al., J. American Chem. Soc., 1997, vol. 119, pages 5081–90; A. C. Pease et al., 1994, Proceedings of the National Academy of Sciences, Vol. 91, pages 5022–6; and reviews by Ramsay, Nature Biotechnology, 1998, Vol. 16, pages 40–44; and Marshall et al., Nature Biotechnology, 1998, Vol. 16, pages 27–31). Nucleic acid hybridization arrays such as those on DNA chips permit quick and accurate detection of soluble oligonucleotides in a sample having a specific nucleotide sequence.

A nucleic acid hybridization array can also be used as an oligonucleotide storage device from which oligomers having selected nucleotide sequences can be obtained, as described in U.S. application Ser. No. 09/078,761 filed May 15, 1998. To accomplish this, single-stranded oligomers tethered to a hybridization array are hybridized to saturation with complementary oligonucleotides. Soluble oligonucleotides having a desired sequence can then be selectively released from individual array sites by localized denaturation, e.g., by localized heating of the array sites at which the desired oligonucleotides are hybridized.

Oligonucleotides and their analogs are now shown to be particularly suitable for representing information such as letters, words, or phrases of a body of text, numeric data, or the digital values that define a graphical image. Among the properties of oligonucleotides which favor their use in this manner are their ability to store large amounts of information as ordered sequences of nucleotides, their ability to be amplified, the rapid recognition and high-affinity hybridization of complementary strands, the availability of a large number of different enzymes and procedures for chemically modifying nucleic acid oligomers, and the ability to quickly and efficiently obtain and detect oligonucleotides having selected nucleotide sequences, using methods employing nucleic acid hybridization arrays or chemical synthetic and sequencing procedures.

BRIEF SUMMARY OF THE INVENTION

The invention provides methods for encrypting information, such as letters, words or numeric data of a message, or digital values that define a graphical image, by obtaining a set of nucleic acid strands or their analogs having selected nucleotide sequences that represent the information. Decryption of the information is accomplished by using a key that identifies the information represented by the nucleotide sequences of the nucleic acid strands. Preferably, the nucleic acid strands or nucleic acid analog strands that are used to represent encrypted information are oligonucleotides or oligonucleotide analogs. Nucleic acids have very high information storage density; a set of 100 copies of each of $10^{10}$ different 40-mer oligonucleotide sequences, each representing a different letter, word, phrase, or set of digital values, has a mass that is significantly less than a microgram. Thus, information that is encrypted as a set of oligonucleotides can be transmitted to an intended recipient in a form that is nearly undetectable, and can only be understood by someone in possession of a key for decryption.

The invention provides methods comprising obtaining oligonucleotides or their analogs having selected nucleotide sequences representing encrypted information by releasing them from an oligomer-storing device comprising a nucleic acid hybridization array.

The invention also provides methods comprising detecting nucleic acids or their analogs having selected nucleotide sequences representing encrypted information by allowing them to hybridize specifically to a nucleic acid hybridization array, and by detecting the array sites at which they are hybridized.

The invention further provides methods giving multiple additional levels of decryption, comprising:

(i) scrambling the order of the sites in a nucleic acid hybridization array that is used to detect oligomers representing the encrypted information, relative to the order of the sites in the depot array from which the oligomers representing the encrypted information are obtained;

(ii) providing one or more sets of bridging oligomers that specifically hybridize to the oligomers attached to the array sites of a nucleic acid hybridization array, and/or to the oligomers representing the encrypted information, and/or to other bridging oligomers, so as to permit attachment of the oligomers representing the encrypted information to the corresponding sites of said nucleic acid hybridization array; and (iii) providing a set of detectable signal oligomers that specifically hybridize to the oligomers representing the encrypted information, or to bridging oligomers that specifically hybridize thereto, so as to permit detection of the oligomers representing the encrypted information.

The invention also provides methods for transmitting the nucleic acid strands representing the encrypted information to the intended recipient as a solute dissolved in an aqueous solvent, as dried solid matter sealed in a container or adhering to a surface of a co-transmitted article, or as a portion of a larger single- or double-stranded synthetic polynucleotide or recombinant plasmid, plastid, viral, or cellular nucleic acid.

The invention further provides a method for tagging an article with information which identifies the article, wherein "tags" comprising nucleic acids or their analogs having selected nucleotide sequences are reversibly attached to the article. The article so tagged can be identified by removing some of the nucleic acid and identifying their nucleotide sequences.

BRIEF DESCRIPTION OF THE FIGURES

FIG. 1A illustrates a single bridging oligomer (16) that is hybridized to an oligomer (14) attached to a substrate (1) at an array site, and also to a cryptograph strand (15) comprising a detectable moiety (23) such as a fluorescent group.

FIG. 1B shows two different bridging oligomers (17 and 18) that hybridize to each other to form a bridge that links a fluorescent cryptograph strand (15) to an oligomer (14) attached to an array site.

FIG. 1C shows a signal oligomer (19) labeled with a detectable moiety (23), that is hybridized specifically to a subunit sequence of a cryptograph strand (15), and a bridging oligomer (16) that links the cryptograph strand to an oligomer (14) attached at a site in a hybridization array.

FIG. 1D shows a signal oligomer (20) hybridized specifically to a bridging oligomer (22), which is one of three different bridging oligomers (16, 21, and 22) that are linked directly or indirectly to the cryptograph strand (15) and to an oligomer (14) attached at a site in a hybridization array.

DETAILED DESCRIPTION OF THE INVENTION

Figure 1A:
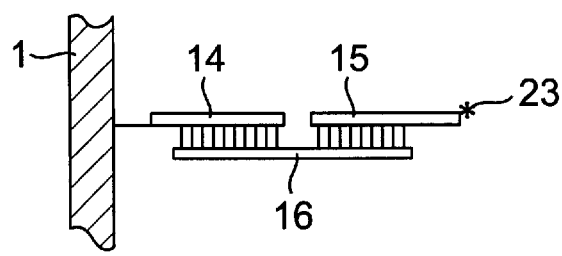
FIGS. 1A–1D schematically portray bridging oligomers linking cryptograph strands to oligomers attached to sites of a hybridization array, and signal oligomers hybridizing directly to cryptograph strands, or to bridging oligomers hybridized thereto.

While specific embodiments and preferred methods and materials of the invention are described herein, the invention is not limited to the particular methodology, protocols, and materials described. It is understood that methods, materials, and devices similar or equivalent to those described herein can be used successfully in the practice or testing of the present invention, and that the present invention as described herein is capable of further modifications, and this application is intended to cover any variations, uses, or adaptations of the invention following, in general, the principles of the invention and including such departures from the present disclosure as come within known or customary practice within the art to which the invention pertains and as may be applied to the essential features set forth herein and as follows in the scope of the appended claims. All publications, patents, and patent applications mentioned herein are incorporated by reference for the purpose of describing and disclosing the materials and methodologies which are reported in the publications, patents, and patent applications, which might be used in connection with the invention. Unless defined otherwise, all technical and scientific terms used herein have the same meaning as commonly understood by one of ordinary skill in the art to which this invention belongs. It must also be noted that as used herein and in the appended claims, the singular forms "a", "and," and "the" include plural reference unless the context clearly indicates otherwise. For example, reference to "an oligomer comprising a subunit sequence" includes a plurality of such oligomers.

The methods of the present invention employ, unless otherwise indicated, conventional methods and practices of cryptology, which are within the capabilities of a person of ordinary skill in the art. Examples of such methods and practices are reviewed in F. B. Wrixon, *Codes and Ciphers*, Prentice Hall, New York, N.Y., 1992. The methods of the present invention also employ conventional techniques of chemistry, biochemistry, molecular biology, and recombinant DNA and nucleic acid diagnostic methodologies, which are within the capabilities of a person of ordinary skill in these arts. Such techniques are fully explained in the literature. See, for example, Sambrook et al., 1989, *Molecular Cloning: A Laboratory Manual*, Second Edition, Books 1–3, Cold Spring Harbor Laboratory Press; B. Roe, J. Crabtree, and A. Kahn, 1996, *DNA Isolation and Sequencing: Essential Techniques*, John Wiley & Sons; J. M. Polak and James O'D. McGee, 1990, *In Situ Hybridization: Principles and Practice*, Oxford University Press; M. J. Gait (Editor), 1984, *Oligonucleotide Synthesis: A Practical Approach*, IRL Press; D. M. J. Lilley and J. E. Dahlberg, 1992, *Methods of Enzymology: DNA Structure Part A: Synthesis and Physical Analysis of DNA*, Academic Press; and J. D. Wilson, M. Gilman, J. Witkowski, and M. Zoller, 1992, *Recombinant DNA*, Second Edition, Scientific American Books.

Encrypting Information

The present invention comprises encrypting information by obtaining a set of one or more nucleic acid strands or nucleic acid analog strands comprising selected sequences of contiguous nucleotides or nucleotide analogs that represent the information. As used herein, the terms "subunit sequence" and "sequence of subunits" both refer to a set of contiguous nucleotides or nucleotide analogs in a nucleic acid strand or nucleic acid analog strand, respectively. Nucleic acid strands or nucleic acid analog strands comprising subunit sequences that represent encrypted information are referred to herein as "cryptograph strands". A sequence of subunits in a given cryptograph strand that is selected to represent encrypted information can comprise from one to all of the nucleotides or nucleotide analogs of that cryptograph strand. A single cryptograph strand can comprise two or more different subunit sequences, each representing different portions of the encrypted information. The two or more different subunit sequences in a given cryptograph strand that represent encrypted information can be separated in the strand by intervening subunits that do not represent encrypted information; they can abut end-to-end within the strand; or their boundaries can overlap so that one or more contiguous subunits that are part of a subunit sequence representing one portion of the encrypted information can also be part of another subunit sequence that represents a different portion of the encrypted information.

Any information that can be represented by letters, numbers, or other symbols, including prose, musical notation, mathematical vectors, formulas, and matrices, and sets of digital values that define monochrome, gray-scale, or colored graphical images, can be represented by one or more cryptograph strands having selected subunit sequences. The process of selecting one or more sequences of nucleotides or nucleotide analogs to represent a body of information, and of obtaining a set of one or more different types of cryptograph strands comprising the subunit sequences selected to represent the information, is referred to herein as "encryption" of the information. In conventional cryptology, the term "encryption" refers both to "enciphering," in which the component letters and numbers of a message are replaced by other letters and/or numbers, and "encoding," in which whole words or phrases are replaced with other words or groups of letters and/or numbers, (F. B. Wrixon, *Codes and Ciphers*, Prentice Hall, New York, N.Y., 1992, see pages xii, 29, 34). Analogously, encryption of a body of information according to the present invention comprises selecting sets of contiguous nucleotides or nucleotide analogs to represent the letters, numbers, formulas, words, phrases, vectors, or other components, of said body of information. One skilled in the art of cryptology will readily appreciate that there are a multitude of different ways by which the elements of a body of information can be represented by one or more sequences of nucleotides or nucleotide analogs in a set of cryptograph strands. For example, the four natural nucleotides, adenosine (A), thymine (T), guanosine (G), and cytosine (C), can be combined to make a set of $4^4$, or 256, different 4-mers, the members of which can be used as a cipher that represents the letters of the alphabet, the numbers 0–9, punctuation marks, mathematical symbols, and other symbols of a message. Alternatively, whole words or phrases can be encoded as a set of nucleotide sequences; for example, there are $4^{18}$, or about 70 billion, different 18-mers that can be made using the nucleotides A, T, G, and C, so that all of the commonly used words and phrases of a language, as well as the language's punctuation marks, can be codified as individual 18-mers, and a set of 18-mers can then be selected that accurately represents any message or body of text written in that language. Those skilled in the art will have no difficulty devising other systems, in addition to the two examples given above, by which the content of a body of information can be represented by different nucleic acid subunit sequences.

As noted above, a single cryptograph strand can comprise two or more subunit sequences, each representing a different portion of an encrypted body of information. For example, a message of only six words can be represented by six different 6-mers, each representing one of the words of the message, that together form a contiguous string of 36 nucleotides that is present in a nucleic acid strand. A large amount of information can be encrypted by obtaining two or more different cryptograph strands comprising subunit sequences that represent the information. For example, an array of 600×800 digital values that defines a graphical image can be represented by a set of 480,000 different oligonucleotides, each comprising a different 12-mer sequence that identifies its position in the array, and further comprising a second sequence of subunits which identifies a gray-scale or color value for the image pixel at the respective position in the array. Of course, the cryptograph strands representing a monochrome image such as a black-and-white line drawing or a page of text need not comprise sequences identifying color or gray-scale values, and such an image can be represented by a number of cryptograph strands that is much smaller than 480,000, since cryptograph strands representing background pixels of the image are not needed to define the image.

When a body of information is represented by two or more different cryptograph strands, it is preferred that each of the different cryptograph strands comprise a subunit sequence that identifies the relative position of the portion of the information represented by each of said cryptograph strands in the complete body of information. For example, if the encrypted information is a linear string of letters or numbers that is represented by subunit sequences present in a set of two or more different cryptograph strands, each of the different cryptograph strands can further comprise one or more subunit sequences that identify the relative position of the portion(s) of the information represented by the subunit sequences of said strand in the complete information string. In a preferred embodiment, the cryptograph strands representing the body of information are selected from a set of nucleic acid strands comprising subunit sequences that hybridize specifically to single-stranded oligomers attached to sites of a nucleic acid hybridization array such as a DNA chip, thereby permitting the identities of the subunit sequences present in the cryptographic strands, and also the relative ordering of the portion of the information represented by each cryptographic strand, to be inferred from the position of the site in the array to which the strand hybridizes. The requirement for a specific nucleic acid hybridization array to permit identification of the subunit sequences of cryptograph strands, and the ordering or organization of the information represented by the subunit sequences of the cryptograph strands, constitutes another level of encryption.

As used herein, the term "oligomers" refers to RNA or DNA oligonucleotides, RNA or DNA oligonucleotide analogs, or a combination of RNA and/or DNA oligonucleotides and RNA and/or DNA oligonucleotide analogs. The statement that a cryptograph strand or an oligomer "hybridizes specifically" to another oligomer, as used herein, means that a subunit sequence of a cryptograph strand or a first oligomer is sufficiently complementary to a subunit sequence of a second oligomer that the subunit sequence of the cryptograph strand or first oligomer hybridizes by Watson-Crick base-pairing to the subunit sequence of the second oligomer to form a stable double-stranded complex, under hybridization conditions that are sufficiently stringent that cryptograph strands or oligomers having fewer bases complementary to, or forming less stable duplex structures with, the second oligomer do not also hybridize to the second oligomer and form stable double-stranded complexes. Selection of parameters such as the lengths of the complementary portions of different nucleic acid molecules or their analogs, and the conditions used in hybridization and wash steps, so that the nucleic acids or their analogs hybridize specifically to their counterparts, is well within the capabilities of a person of ordinary skill in the art (e.g., see chapter 11 of Sambrook et al., 1989, *Molecular Cloning: A Laboratory Manual, Second Edition*, Cold Spring Harbor Laboratory Press).

Multiple additional levels of encryption can be obtained through the use of bridging oligomers and signal oligomers. As used herein, the term "bridging oligomers" refers to an oligonucleotide or its analogs that comprises two subunit sequences, each of which hybridizes specifically and independently to a subunit sequence of an oligomer attached to an array site, a cryptograph strand, another bridging oligomer, or a signal oligomer. As shown in FIGS. 1A through 1D, by hybridizing specifically to subunit sequences of two different oligomers simultaneously, bridging oligomers operate as "splints" that allow cryptograph strands to bind specifically to sites of a nucleic acid hybridization array, even though the subunit sequences of the cryptograph strands are not complementary to those of the oligomers that are permanently attached to the hybridization array.

Figure 1B:
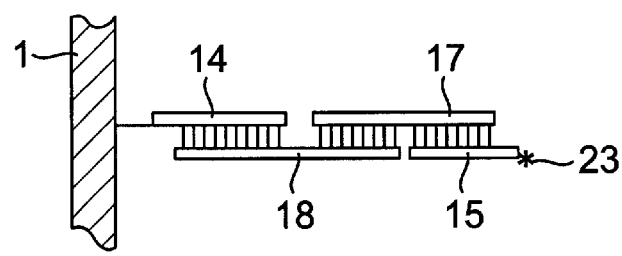

FIG. 1A schematically illustrates a bridging oligomer (16) comprising a first subunit sequence that is hybridized to an oligomer (14) attached to a substrate (1) at an array site, and a second subunit sequence that is hybridized to a cryptograph strand (15) comprising a detectable moiety such as a fluorescent group (23). As shown in FIG. 1B, two different bridging oligomers (17 and 18) can specifically hybridize to each other to form a bridge that links a fluorescent cryptograph strand (15) to an oligomer (14) attached to an array site. Each of the two different bridging oligomers that are required to link the cryptograph strand to the oligomer attached to the array can belong to a different set of bridging oligomers, both of which sets must be obtained to identify the site in the array at which the cryptograph strand binds.

Figure 1C:
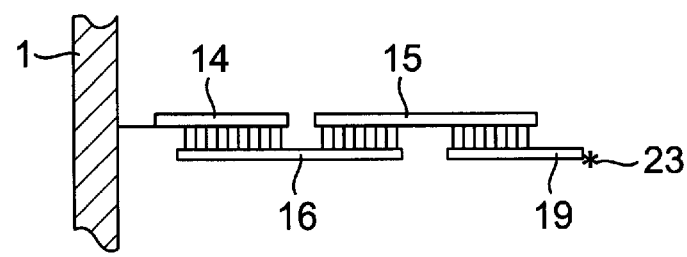
Figure 1D:
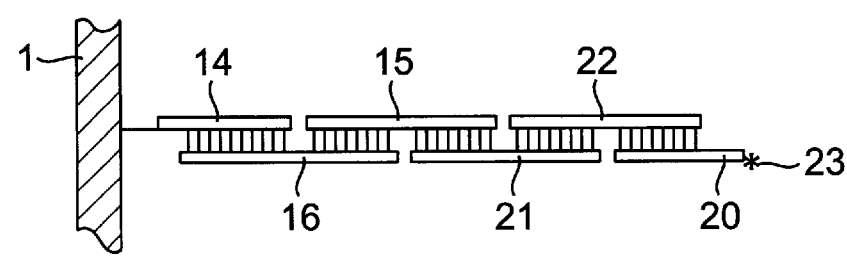

Signal oligomers afford another level of encryption, by identifying the sites in a nucleic acid hybridization array at which cryptograph strands are bound. The term "signal oligomer" as used herein refers to an oligonucleotide or its analog that comprises a detectable signaling moiety, such as a fluorescent label (A. C. Pease et al., Proceedings of the National Academy of Sciences, 1994, Vol. 91, pp. 5022–5026; Heller et al., U.S. Pat. No. 5,605,662, column 23, lines 14–23), and a subunit sequence that hybridizes specifically to a subunit sequence of a cryptograph strand or a bridging oligomer. FIG. 1C shows a signal oligomer (19) labeled with a detectable moiety (23) that is hybridized specifically to a subunit sequence of a cryptograph strand (15), and a bridging oligomer (16) linking the cryptograph strand to an oligomer (14) that is attached at a site in a hybridization array. Signal oligomers can also be used in combination with two or more bridging oligomers; for example, FIG. 1D shows a signal oligomer (20) hybridized specifically to a bridging oligomer (22), which is one of three different bridging oligomers (16, 21, and 22) that are linked directly or indirectly to the cryptograph strand (15) and the oligomer (14) attached to the array substrate. Thus, one or more different sets of bridging and signal oligomers can be required, in addition to a specific nucleic acid hybridization array, in order to decrypt the information represented by a set of cryptograph strands.

Figure 2:
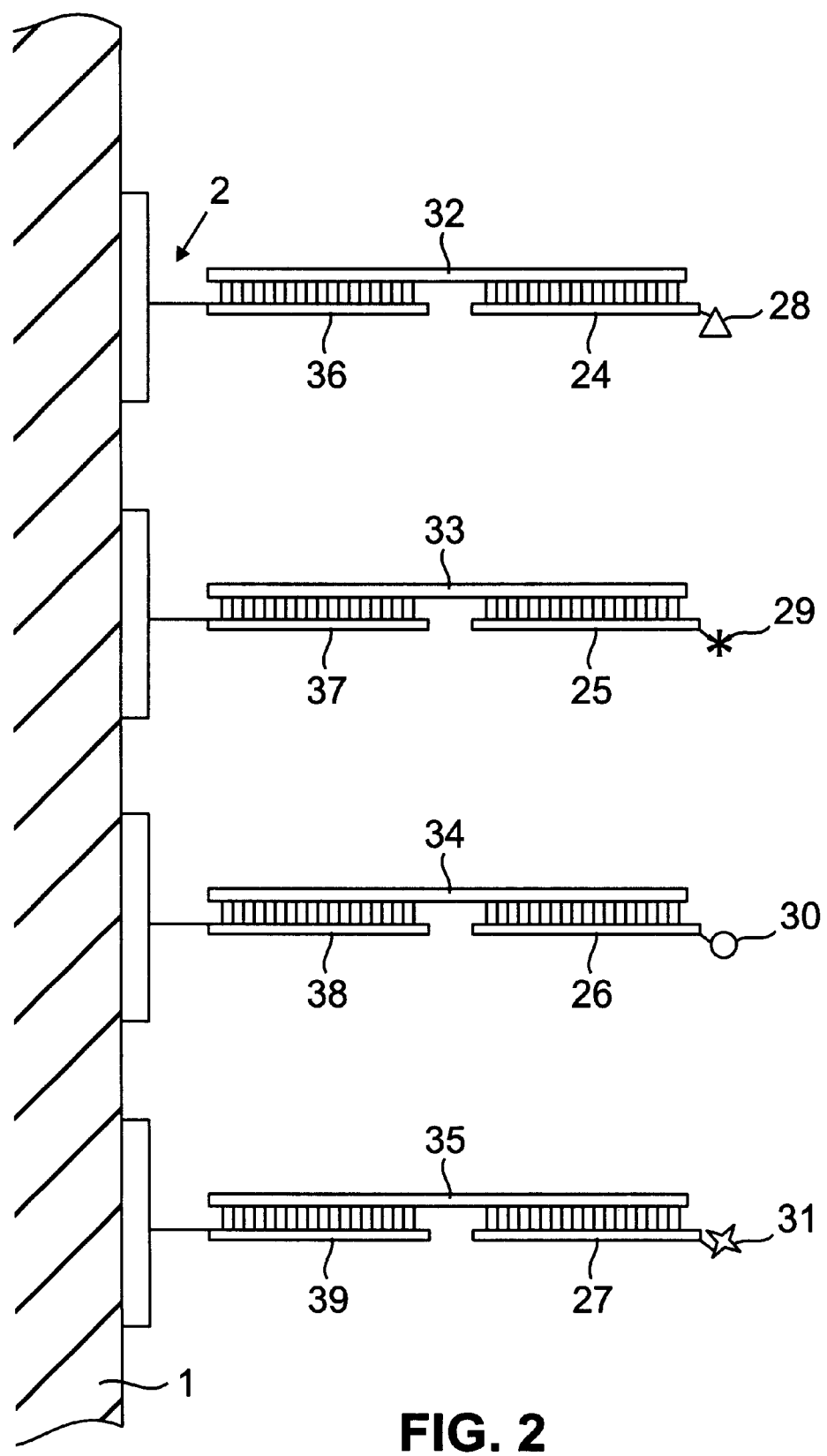
FIG. 2 schematically represents different signal oligomers (24, 25, 26, and 27) conjugated to distinctive detectable moieties that represent specific numeric or color values (28, 29, 30, and 31), which signal oligomers are hybridized specifically to cryptograph strands (32, 33, 34, and 35) that represent the same numeric or color values and that are in turn hybridized specifically to oligomers (36, 37, 38, and 39) attached to sites in a hybridization array.

Signal oligomers can also be used to identify the numeric or color values represented by individual cryptograph strands in an embodiment of the invention in which a set of cryptograph strands representing a two-dimensional matrix of numeric or color values, e.g., values defining a graphical image, is specifically hybridized to sites of a nucleic acid hybridization array. In this embodiment, each of the cryptograph strands ((32–35) in FIG. 2) comprises a first subunit sequence that hybridizes specifically to an oligomer ((36–39 in FIG. 2) attached at an array site (2) on a substrate (1), and a second subunit sequence that represents a numeric or color value. For each different numeric or color value, a signal oligomer ((24–27) in FIG. 2) is obtained which comprises a subunit sequence that hybridizes specifically to a cryptograph strand subunit sequence representing that value, and which is also conjugated to a distinctive detectable moiety ((28–31) in FIG. 2) that identifies the numeric or color value. Suitable detectable moieties include fluorescent chemical groups that emit light of different colors (see, for example, Ju, U.S. Pat. No. 5,814,454; Tyagi et al, Nature Biotechnology, 1998, Vol. 16, pages 49–53), and chemical groups or sequences of subunits having distinctive masses that can be identified by mass spectroscopy (Marshall, Nature Biotechnology 16, pp. 30–31, 1998; Ross et al., Nature Biotechnology 16, pp. 1347–1351, 1998; Laken et al., Nature Biotechnology 16, pp. 1352–1356, 1998). The cryptograph strands representing the set of numeric or color values are allowed to hybridize specifically to the hybridization array and to the set of signal oligomers, as shown in FIG. 2. Detection of the distinctive detectable moieties of the signal oligomers bound specifically to sites of the hybridization array permits identification of the numeric or color value represented by the cryptograph strands hybridized at those sites.

An additional degree of encryption can be implemented by mixing the cryptograph strands with nucleic acids or their analogs that are like the cryptograph strands in structure and length, but which do not comprise subunit sequences that represent encrypted information. Decryption then includes a step for selectively identifying the cryptograph strands; for example, by using a nucleic acid hybridization array comprising attached oligomers which selectively bind the cryptograph strands; by amplifying the cryptograph strands with selectable primers and separating the amplified, primer-containing molecules from the non-amplified molecules by chromatography, magnetic separation, or electrophoresis; or by other means known to those skilled in the art of molecular biology and nucleic acid separation, detection, and identification.

The Decryption Key

All of the information and/or instructions, and any special physical materials or devices, that are required to enable one to decrypt and recover the original information that is encrypted as a set of cryptograph strands according to the present invention, are referred to herein collectively as the "decryption key," the "key for decryption," or simply the "key." The nature and complexity of the decryption key depends on the particular system chosen for encrypting the original information, and on the methods and materials required to identify subunit sequences in the cryptograph strands that represent that information. The key identifies the way in which the subunit sequences of the cryptograph strands represent the letters, numbers, formulas, words, etc., of the encrypted body of information. As discussed above, the key can also include primers needed to amplify part or all of the cryptograph strands, and a nucleic acid hybridization array and any bridging and signal oligomers needed to identify subunit sequences of the cryptograph strands. The key can also include specific hybridization probes, compositions of reagents, and conditions such as temperature and reaction time, that are employed in hybridization reactions to identify subunit sequences of the cryptograph strands, and any other methods, materials, or equipment used to detect and identify subunit sequences of the cryptograph strands. Since a set of cryptograph strands that is used to represent a message according to the present invention can have a mass of less than a nanogram and so can be nearly undetectable (see below), the key can also include information identifying the precise location of a set of cryptograph strands; for example, embedded in or adhering to a transmitted article.

Cryptograph Strands

A cryptograph strand of the present invention can be an oligonucleotide or oligonucleotide analog strand of about 6 to 100 or more subunits, or a strand of a recombinant plasmid, viral, or cellular DNA or RNA molecule, that comprises one or more subunit sequences representing encrypted information. In an embodiment that is a "hybrid" of these alternatives, a cryptograph strand can be a strand of a double-stranded DNA molecule such as a recombinant plasmid, viral, or cellular DNA, in which the subunit sequences representing encrypted information are flanked by nucleotide sequences that are specifically cleaved by a restriction endonuclease. Cleavage of the double-stranded DNA comprising the cryptograph strand with the appropriate restriction endonuclease results in production of a set of one or more oligonucleotides comprising the subunit sequences representing the encrypted information. For this embodiment, the key for decryption includes the identity of the restriction enzyme that is used to excise the oligomers representing the encrypted information.

In a preferred embodiment of the invention, the cryptograph strands are RNA or DNA oligonucleotides, RNA or DNA oligonucleotide analogs, or a combination of RNA and/or DNA oligonucleotides and RNA and/or DNA oligonucleotide analogs.

An advantage of the present invention is that the cryptograph strands can be amplified, so that the physical mass of the cryptograph strands that must be transmitted to communicate the encrypted information can be extremely small. For example, $10^9$ copies of a recombinant plasmid pBR322 containing an insert of about 600 nucleotides representing encrypted information has a mass of approximately 5 ng ($5 \times 10^{-9}$ grams). This amount of plasmid DNA can readily be amplified to produce milligram quantities of the plasmid by culturing *E. coli* cells into which the plasmid has been introduced. Similarly, recombinant viral and cellular genomic DNA comprising cryptograph strands can be amplified by using routine methods to propagate a virus or host cell having the recombinant genome.

Subunit sequences of cryptograph strands representing encrypted information can also be amplified by enzyme-based, cell-free amplification methods such as PCR (H. A. Erlich, Editor, *PCR Technology, Principles and Applications for DNA Amplification*, Stockton Press, New York, 1989, pp. 1–111) and SDA (Fraiser et al., U.S. Pat. No. 5,648,211, columns 1–18). In such embodiments, the subunit sequences in the cryptograph strands that represent the encrypted information are flanked by nucleotide sequences that hybridize specifically to amplification primer oligomers, and the key for decryption includes the identity of the primers that are required to amplify the subunit sequences representing the encrypted information.

Oligomers

Oligonucleotides or their analogs of the present invention include cryptograph strands, bridging and signal oligomers, oligomers attached to sites of a nucleic acid hybridization array, amplification primers, and hybridization probes. The RNA or DNA oligonucleotide analogs employed for the present invention can be oligomers in which from one to all nucleotides are replaced with a corresponding number of nucleotide analogs to confer desired properties such as increased resistance to degradation by a nuclease, increased detectability, and increased hybridization affinity. Such oligonucleotide analogs include but are not limited to oligomers comprising 2'-O-alkyl ribonucleotides, phosphorothioate or methylphosphonate internucleotide linkages, peptide nucleic acid subunits, and nucleotides modified by attachment of radioactive or fluorescent groups, groups which intercalate, cross-link or cleave a nucleic acid, or groups which alter the electric charge or hydrophobicity of the oligomers. Methods for making and using oligonucleotides and oligonucleotide analogs such as those listed above are well known to those skilled in the arts of nucleic acid chemistry and molecular biology.

In general, an essential characteristic of the oligomers employed in practicing the invention is that they are able to hybridize specifically to oligomers having complementary subunit sequences to form stable double-stranded complexes.

The sizes of the oligomers employed in practicing the present invention can range from about 6 subunits to 100 or more subunits in length. An oligomer having n subunits is referred to as an n-mer; for example, a nucleic acid oligomer that contains 12 or 17 nucleotides is referred to as a 12-mer or as a 17-mer, respectively. One skilled in the art would appreciate that in order for the oligomers to hybridize specifically to form stable double-stranded complexes, the oligomers should be at least about 6–8 nucleotides in length. The portion of any given oligomer that is selected to represent an element of encrypted information according to the method of the present invention can vary from one to all of the nucleotides of the oligomer; preferably, from about 8 up to about 20, about 30, or about 50 nucleotides; and most preferably from about 10 to about 40 nucleotides. As discussed below, n-mers comprising a sequence of subunits representing encrypted information preferably have about 6 to 12 additional nucleotides added to each end to permit amplification by PCR using a common set of primers. Thus, nucleic acid oligomers representing encrypted information are typically about 20 to about 74 or more nucleotides in length; preferably about 20 to about 60 nucleotides in length.

The methods of the present invention comprise allowing soluble oligomers such as oligomers comprising sequences representing encrypted information, and bridging oligomers, to hybridize specifically to oligomers attached to a substrate; such soluble oligomers can be longer, shorter, or the same length as the attached oligomers. In addition, such soluble oligomers having different lengths, chemical structures and properties, can be hybridized to different sites of the same oligomer array, and even to the same site of said array.

Those skilled in the art appreciate that, under a given set of reaction conditions, the specificity and affinity with which the oligomers of the present invention hybridize to each other are determined, in large part, by the length, nucleotide sequence, and chemical structure of the oligomers, and so are able to select structural parameters of the oligomers employed in the present invention that are appropriate for their intended use. For example, the subunit sequences of the different types of soluble oligomers, and of the oligomers attached to solid substrates, can be selected so that the oligomers do not comprise self-complementary sequences that stabilize folding of said oligomers into hairpin structures which interfere with formation of inter-strand duplexes. Additionally, the subunit sequences of the oligomers can be selected so that the melting temperatures (Tm) of the double-stranded complexes formed by hybridization of the complementary portions of the soluble oligomers and the attached oligomers at the different sites of the array are all within a selected temperature range, e.g., in the range of a selected Tm plus or minus about 5 degrees C., for more efficient control of oligomer hybridization and release.

Obtaining Oligomers by Chemical Synthesis

The present invention employs one or more sets of different oligomers, for example, DNA oligonucleotides or their analogs, having specified lengths and nucleotide sequences. The oligomers of the present invention can be made by well-known methods that are routinely used by those skilled in the art of synthesizing oligonucleotides and/or oligonucleotide analogs (for example, see M. J. Gait (Editor), 1984, *Oligonucleotide Synthesis: A Practical Approach*, IRL Press; D. M. J. Lilley and J. E. Dahlberg, 1992, *Methods of Enzymology: DNA Structure Part A: Synthesis and Physical Analysis of DNA*, Methods in Enzymology, Vol. 211, Academic Press; and S. Agrawal, 1993, *Protocols for Oligonucleotide Conjugates: Synthesis and Analytical Techniques* (Methods in Molecular Biology, Volume 26), edited by, Humana Press).

Obtaining Oligomers From An Oligomer-Storing Device

In preferred embodiments of the invention, the oligomers used to represent the encrypted information, the bridging and signal oligomers, and any other oligomers used in encrypting or decrypting the information, are synthesized and stored in an oligomer-storing device, from which they are released as they are needed. A preferred oligomer-storing device comprises a substrate supporting an array of oligomer storage sites, or depots, each of which comprises a surface to which are attached oligomers having a selected subunit sequence. The oligomers are stored in the depots of the storing device by allowing them to hybridize by Watson-Click pairing to the oligomers attached to the surfaces of said depots to form double-stranded complexes. When oligomers having a particular nucleotide sequence are needed, they are released from the oligomer-storing device by locally denaturing the double-stranded complexes of the depot in the storage array where they are stored, e.g., by localized heating, without denaturing double-stranded complexes of the depots storing other oligomers, and the desired oligomers are collected from the solution in contact with the oligomer storage array.

The substrate supporting the array of oligomer storage sites, or depots, can have a flat surface that supports the array, or it can be distributed in three dimensions, such as in a gel, a fibrous or granular matrix, or in a porous solid. A substrate which is suitable for supporting immobilized nucleic acids for hybridization analysis can, in general, be adapted for use as an oligomer storage device of the present invention. Accordingly, a variety of different designs and materials are available for preparing the oligomer-storing device of the present invention. For example, the storage device may be a flexible filter, e.g., of nylon or nitrocellulose, or it may be of a rigid material such as silica, silicon, glass, crystalline $Al_2O_3$ ("synthetic sapphire"), beryllium oxide, or a solid substrate coated with a noble metal such as gold. Methods for making such substrate supports for hybridizing oligomers are well known to those skilled in the art (see G. McGall et al., U.S. Pat. No. 5,412,087, col. 6, lines 1–39; S. Fodor et al., U.S. Pat. No. 5,445,934, col. 11, lines 49–63; M. Heller et al., U.S. Pat. No. 5,605,662, col.9, line 10, to col. 32, line 7; G. Ramsay, Nature Biotechnology 16, pages 40–42, 1998; R. Drmanac et al., Genomics 4, pages 114–128, 1989; and C. Mirkin et al., Nature 382, pages 607–609, 1996). The storage device may also include a chamber or container housing the substrate, through which oligomer hybridization, wash, and collection solutions are directed, for convenience of use similar to that of a chromatography column.

Figure 3:
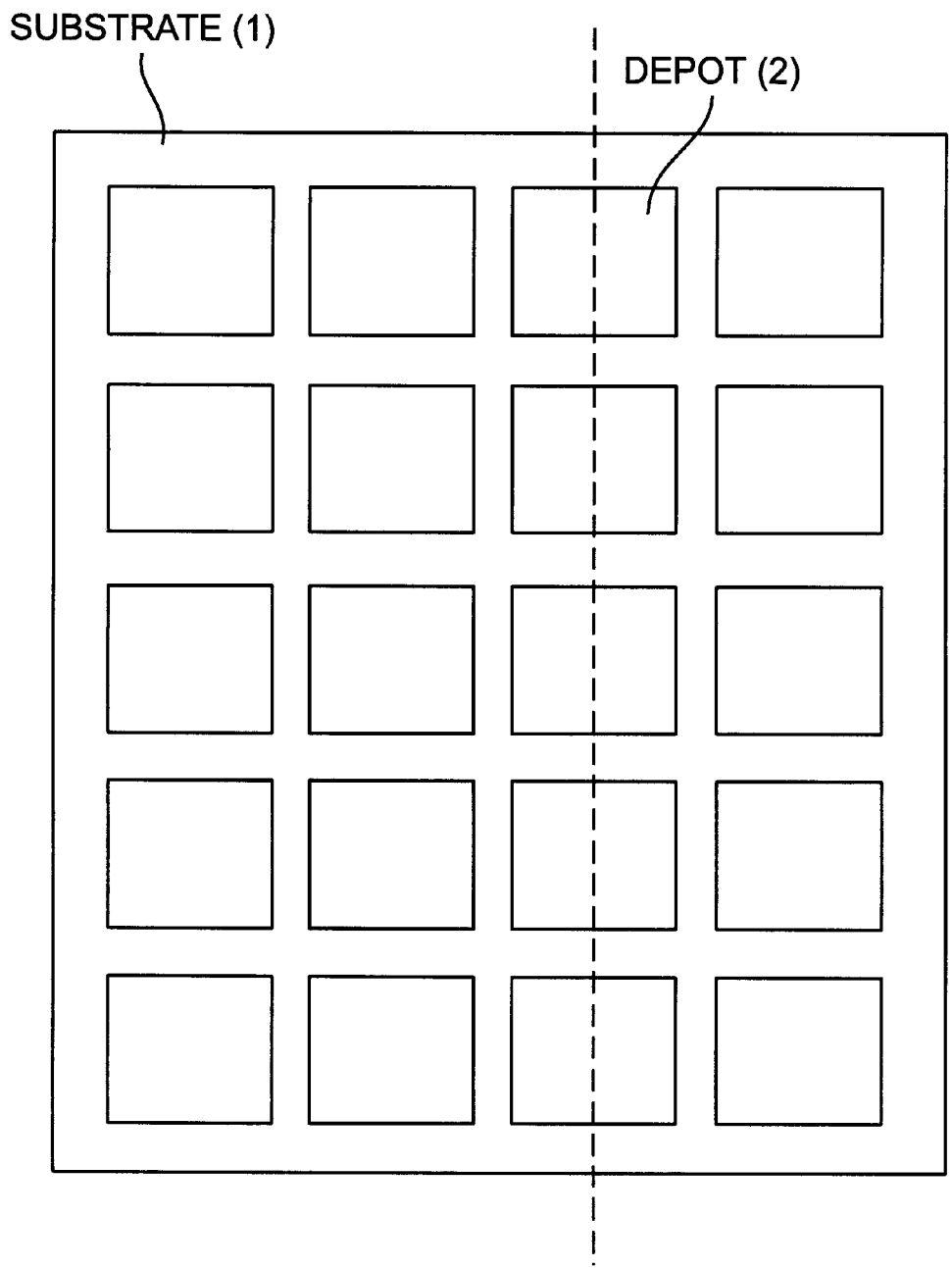
FIG. 3 schematically represents an oligomer-storing device comprising a substrate (1) supporting an array of oligomer depot sites (2). The dotted line indicates the section giving the view shown in FIG. 4.
Figure 4:
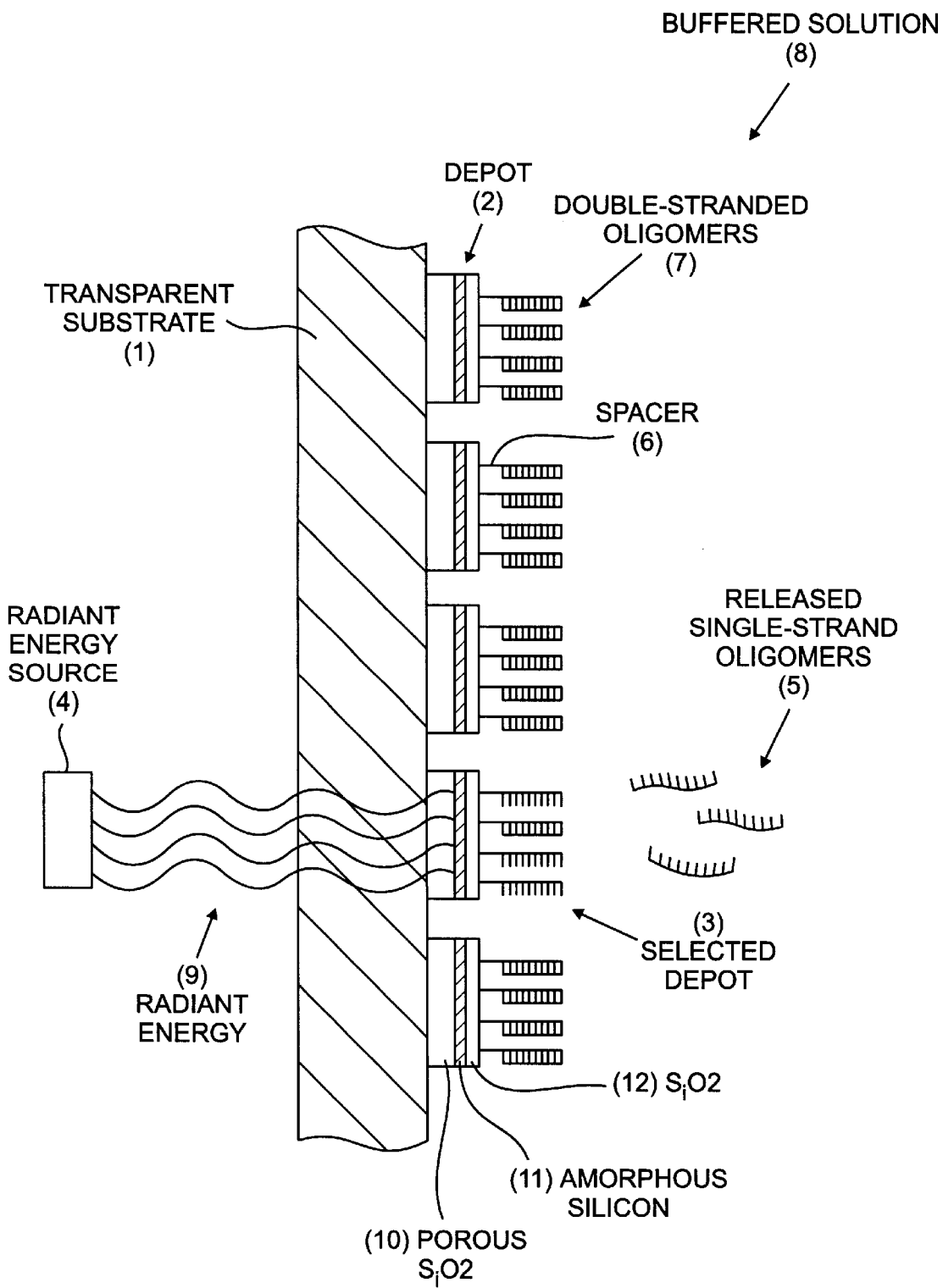
FIG. 4 schematically represents a cross-section through a row of depot sites of the oligomer-storing device shown in FIG. 3, for which the substrate (1) is a transparent substrate. A preferred embodiment of the present invention is shown wherein localized heating of a selected depot (3) is achieved by using a source of radiant energy (4) to irradiate the selected depot site through the transparent substrate (1) to release the desired single-stranded oligomers (5).

The terms "depot" and "depot site" as used herein refer to a site at which oligomers are stored, and comprises a delimited area or volume that is part of or is attached to the supporting substrate, to the surface of which are attached hybridizing oligomers comprising a selected subunit sequence (for example, see (2) in FIGS. 2 and 4). A depot site can have any size, shape, or volume, consistent with the objective of the invention of storing and selectively releasing oligomers as needed. By "array" is meant an arrangement of locations, or depots, in or on the supporting substrate of the oligomer-storing device. The depots can be arranged in 2- or 3-dimensional arrays, or other matrix formats. FIG. 3 shows a 2-dimensional 4×5 array of depots on a supporting substrate. The number of depots in the array can range from 2 to $10^7$ or more. It is within the knowledge of those skilled in the art to fabricate a rigid substrate supporting an array of oligomer depot sites that range in diameter from about 1 micron to 1 centimeter or more, and an array of depot sites that are 5–10 microns in diameter can readily be made with an array density of about $10^6$ depot sites per $cm^2$ (see G. McGall et al., U.S. Pat. No. 5,412,087, col. 8, lines 50–68; S. Fodor et al., U.S. Pat. No. 5,445,934, col. 9, lines 10–18; and G. Ramsay, Nature Biotechnology, 1998, Vol. 16, page 40). All of the depot sites of a given array can have the same diameter, or a single depot array can comprise depot sites having different diameters. Preferably, the oligomer-storing device stores $10^2$ to $10^7$ different types of oligomers of about 6 to about 100 subunits in length in a micro-array of thermally isolated depot sites on a rigid substrate.

The oligomers attached at the depot sites can be attached directly to the surface of the substrate, or to the surface of a pad or pedestal-like structure that is itself attached to the substrate, and which is made of material that is the same as, or different from, that of the substrate. The depot surface to which the oligomers are attached can be located on a raised feature or in a well-like depression on the surface of the supporting substrate. FIG. 4 shows oligomers attached to a depot site (2) comprising a raised pad comprising three different layers ((10), (11), and (12)) affixed to a rigid transparent substrate (1).

Methods for making arrays comprising oligomers attached at depot sites to produce oligomer-storing devices for the present invention are well known. Such methods include in situ synthesis of oligomers attached at their 3' ends to a functionalized surface such glass, $SiO_2$, or GaAs (for example, see G. McGall et al., U.S. Pat. No. 5,412,087, col. 4, line 67 to col. 10, line 35; S. Fodor et al., U.S. Pat. No. 5,445,934, col. 23, line 3, to col. 25, line 18; and M. Heller et al., U.S. Pat. No. 5,605,662, col. 17, lines 21–63). Alternatively, pre-synthesized oligomers can be chemically attached to the substrate, e.g., by derivatizing the oligomers or the attachment surface, and then depositing microdroplets of the oligomers at the appropriate depot sites and allowing the oligomers to react with the depot site surface, or by attaching biotinylated oligomers to a streptavidin-coded surface (see G. McGall et al., U.S. Pat. No. 5,412,087, col. 1, line 18 to col. 3, line 13 and col. 6, line 21 to col. 10, line 35; C. Mirkin et al., Nature, 1996, Vol. 382, pages 607–609; C. Cantor et al., U.S. Pat. No. 5,503,980, col. 13, lines 2–9; and Marshall et al., Nature Biotechnology, 1998, Vol. 16, pages 27–29). Preferably, the oligomers are attached to the depot sites through uncharged spacer groups ((6) in FIG. 4) that tether one end of each of the oligomers to the depot surface (M. Heller et al., U.S. Pat. No. 5,605,662, col. 11, line 49, to col. 13, line 45; and A. C. Pease et al., Proceedings of the National Academy of Sciences, 1994, Vol. 91, pages 5022–24), since the use of such spacer groups is known to increase hybridization efficiency (Marshall et al., Nature Biotech-nology, Vol. 16, page 29).

Storing Soluble Oligomers in a Depot Array

Oligomers are stored in the depot array of a storage device by allowing them to hybridize specifically to oligomers comprising complementary subunit sequences which are attached at the depot sites ((2) in FIG. 4), to form double-stranded oligomer complexes attached to the depot sites ((7) in FIG. 4). Those skilled in the art recognize that the number of consecutive complementary nucleotides that must be present in an oligonucleotide so that it hybridizes specifically to a target nucleic acid molecule can vary considerably, from about 4 up to 14 or more, depending on such factors as the complexity of the set of target nucleic acids and the physical conditions (ionic strength, temperature, anionic and cationic reagents, etc.) used in the hybridization and wash steps. A complete set of oligonucleotides comprising every possible sequence of n consecutive nucleotide subunits can be stored in an array of $4^n$ depot sites comprising complementary oligomers by exposing the array to a solution containing the soluble oligomers at a sufficiently low temperature, in a suitable buffer containing a high molar concentration of a monovalent cation such as $Na^+$. The time required to saturate the $4^n$ depot sites with the $4^n$ different n-mer oligomers depends on the concentrations of the oligomers, the temperature, and the concentration of $Na^+$ ions. If the soluble oligonucleotides are applied at a nucleotide concentration of 0.5 mole per liter under conditions favorable for hybridization, the time for half of the hybridization reaction to be completed is about 36 seconds for n=10, and about 16 hours for n=15 (J. Marmur et al., Progress in Nucleic Acid Research, 1963, Vol. 1, page 231; R. J. Britten et al., Methods in Enzymology, 1974, Vol. 29, part E, 363–418; J. G. Wetmur and N. Davidson, J. Molec. Biol., 1968, Vol. 31, page 349; R. J. Britten and D. E. Kohne, Science, 1968, Vol. 161, pages 529–540).

Releasing Selected Oligomers

A custom set of soluble oligomers of known composition is obtained by locally denaturing double-stranded complexes of selected depots of the intact array comprising the desired oligomers, and collecting the oligomers released from the selected depots ((5) in FIG. 4) into the buffer solution in which the array is immersed ((8) in FIG. 4). Denaturation of oligomer complexes at selected depots can be achieved by any of the nucleic acid-denaturing treatments known to those skilled in the art of nucleic acid biochemistry. Those skilled in the art appreciate that the melting temperature of a double-stranded oligonucleotide complex is dependent on the length, nucleotide sequence, and chemical structure of the complex, and on the ionic strength and chemical composition of the solvent (see Sambrook et al., 1989, *Molecular Cloning: A Laboratory Manual, Second Edition*, Books 1–3, Cold Spring Harbor Laboratory Press, page 11.46).

The preferred method for denaturing double-stranded complexes at the selected depots to release the desired oligomers is by locally heating the selected depots so as to subject the selected depots to a raised temperature under appropriate solution conditions for a period of time sufficient to release the desired oligomers from the selected depots. Localized heating of the selected depot surfaces can be achieved by any suitable means in accord with the structure and size of the supporting substrate, and the size and disposition of the individual depot sites. For example, selected depots can be locally heated by illuminating the surface of the array, in a suitable buffer and at a temperature below the melting point of the oligomer duplexes, with a pattern of focused irradiation from a radiant energy source ((4) and (9) in FIG. 4), e.g. an argon laser, that heats only those depots storing the desired oligomers. The laser can be mounted on a support which provides precise x-y translation control, to permit controlled heating of one depot at a time, in serial fashion. Alternatively, the laser can have a broad beam that can irradiate a mask, the image of which can irradiate all of the depots in the array at once. The mask is used to shield the unselected depots so that only those depots containing the desired oligomers are heated. To heat a single depot having a surface area of about 100 $\_m^2$ to about 70° C. in a suitable buffered solution so as to locally melt double-stranded DNA duplexes stored at the heated depot will require roughly 10 milliwatts of argon laser light (488 nm). In the preferred method, a substrate which is transparent to argon laser light, e.g. crystalline $Al_2O_3$, is used to support thermally isolated, light-absorbing, depot surfaces to which the oligomers are attached, allowing back illumination of the desired depots as shown in FIG. 4, and protecting the oligomers from direct exposure to the laser radiation. A substrate of $Al_2O_3$ is also suitable because its relatively high thermal conductivity permits the substrate to act efficiently as a heat sink, drawing heat away from the irradiated depot sites and so providing greater thermal isolation of the unselected depot sites. Alternatively, the storage device substrate comprising the depot array could be in contact with, or have integrated within it, a controllable, addressable, array of resistive heating elements which is spatially aligned with the depot array, so that application of current to selected resistive heating elements locally heats selected depots proximal to the activated heating elements to release the desired oligomers. Heller et al. teach fabrication of a silicon substrate into which is integrated a micro-array of electronically addressable micro-locations corresponding to a micro-array of DNA storage sites (M. Heller et al., U.S. Pat. No. 5,605,662, col. 9–10, 12–16). Accordingly, it is within the knowledge of those skilled in the art of microlithography and thick film circuitry to fabricate a DNA chip in which there is integrated an array of electronically addressable micro-locations comprising resistive heating elements such as can be formed, for example, by depositing undoped polycrystalline silicon at positions between addressable conducting wire grids (T. Kamins, *Polycrystalline Silicon for Integrated Circuit Applications*, 1988, Kluwer Academic Publications, Boston, in entirety). As described by Heller et al., metal contact pads along the outside perimeter of the chip permit the wiring of such a chip comprising an integrated, electronically addressable, micro-array to a microprocessor-controlled power supply and interface for controlling the device (M. Heller et al., U.S. Pat. No. 5,605,662, col. 12). The amounts of oligomers released by localized heating can be controlled by varying the amount of heat applied, e.g., by controlling the intensity of the laser light or the temperature of the resistive heater, and/or by varying the time period during which heat is applied. According to the preferred method, the localized heating of selected depots to release desired oligomers stored therein is electronically controlled by a programmable microprocessor and an interface for controlling the process. Local heating of selected depots will cause oligomer duplexes at the heated depots to melt in a short time, of the order of seconds, to yield single-stranded oligomers in quantities related to the time and extent of heating.

Heller et al. teach that denaturation of DNA at selected depots can also be induced by locally increasing the negative electric potential at the selected depots (M. Heller et al., U.S. Pat. No. 5,605,662, column 20). In addition positively charged chaotropic agents and other denaturants can be added to the solution in contact with the selected depots to promote denaturation of the attached double-stranded complexes. Exposure to denaturing solution conditions can be limited to the depots selected for denaturation by surrounding the selected depot surfaces with a liquid-impermeable barrier that prevents the denaturing solution from contacting non-selected depot surfaces. For example, individual depots of a large-scale array, in which depot surfaces are 0.1 to 10 mm or more in diameter, can be situated in wells or surrounded by raised divider walls to be fluidically isolated from each other, so that selected depot surfaces can be exposed to denaturing solution without also exposing non-selected depot surfaces to the denaturing conditions. Denaturation of selected depots, whether by localized heating, application of increased negative potential, denaturing solution, or any combination of these means, can be carried out serially, one depot at a time, or in parallel with multiple depots being treated simultaneously.

Collecting the Released Oligomers

Oligomers released from selected depot sites following denaturation of double-stranded complexes at those sites ((5) in FIG. 4) are collecting by collecting the solution in contact with the treated depot surfaces ((8) in FIG. 4). The solution in contact with the oligomer-storing depot array can be enclosed or contained within a reservoir, and once the desired oligomers are released into the solution, it can be collected by any suitable means, e.g. by a manually operated or automated pipetting device, or a syringe. Alternatively, the solution containing the desired oligomers can be removed from the reservoir and transferred to a suitable collecting device, and fresh solution can be added to the reservoir in its place, e.g. to wash away residual oligomers in preparation for releasing a different set of oligomers, by using automated or microprocessor-controlled pumps that direct the flow of the different solutions through tubes or fluid-conducting channels that connect to the reservoir.

Transmission of Cryptograph Strands

A set of cryptograph strands representing a body of information can be transmitted to its intended recipient as a solute in an aqueous solution, or as lyophilized or air-dried material. For example, 1,000 copies of each of $10^6$ 40-mer cryptograph strands representing a 1,000×1,000 pixel array defining a graphical image would have a mass of about 21 picograms ($21 \times 10^{-12}$ grams). If 21 micrograms of copies of the cryptograph strands were dissolved in one liter of water, a single microliter of the resulting solution would contain about 1,000 copies of each of the $10^6$ cryptograph strands representing the encrypted image, which amount is more than sufficient to permit recovery of the original image. Liquid containing cryptograph strands can be transmitted in any container than can hold a liquid, for example, a barrel, a flask, a vial, or a fountain pen. The cryptograph strands can even be added to the water that is supplied via water pipes to the recipient so that they are present as trace solutes in the recipient's tap water.

Transmitting cryptograph strands in dry form can be achieved, for example, by placing a droplet of water containing a set of cryptograph strands on a piece of paper and allowing it to dry. The paper can then be transmitted to the intended recipient, who can re-dissolve the cryptograph strands in an aqueous solution and proceed to recover the encrypted information which they represent. Those skilled in the art of cryptology and steganography can appreciate that the ease with which minute quantities of cryptograph strands representing large amounts of encrypted information can be concealed makes them suitable for sending secret communications. As noted above, when a secret message is transmitted as a set of cryptograph strands that is virtually undetectable by anyone without knowledge of where it is hidden, the key for decryption includes the information or instructions permitting one to physically locate the transmitted cryptograph strands.

Cryptograph strands can be introduced into a plasmid or a viral genome, which can then be introduced into a living cell, using routine methods of molecular biology known to those skilled in the art. Alternatively, routine methods employing genetic recombination can be used to introduce cryptograph strands directly into the genome of a living cell. The present invention includes introducing cryptograph strands representing encrypted information into living cells by such methods, and transmitting the cells to the intended recipient, who are then able to isolate the plasmid, viral, or cellular nucleic acids comprising the cryptograph strands and recover the encrypted information.

Identifying Subunit Sequences in Cryptograph Strands That Represent Encrypted Information As used herein, the phrase "identify a subunit sequence of a cryptograph strand" refers to identifying properties or characteristics of the cryptograph strand so as to be able to distinguish it from other cryptograph strands having different subunit sequences. A subunit sequence of a cryptograph strand can be identified by determining the actual sequence of nucleotide subunits of part or all of the cryptograph strand, e.g., by the well-known Maxam and Gilbert chemical-based or the Sanger dideoxynucleotide-based sequencing methods, or by array-based sequencing (see, for example, Drmanac et al., Nature Biotechnology, 1998, Vol.16, pp. 54–58). A subunit sequence of a cryptograph strand that represents encrypted information can also be identified without determining the actual nucleotide sequence of the cryptograph strand. For example, a subunit sequence of a cryptograph strand can be positively identified by determining that it hybridizes specifically to a particular soluble hybridization probe, or that it hybridizes specifically, either by itself or through one or more interconnecting bridging strands, to a specific site of a nucleic acid hybridization array.

The preferred methods for identifying subunit sequences of cryptograph strands representing encrypted information comprise allowing the strands to hybridize to array sites of a nucleic acid hybridization array at which are attached single-stranded oligomers that hybridize specifically to the cryptograph strands, and detecting the sites at which the cryptograph strands hybridize. Those skilled in the art of molecular biology and nucleic acid analysis appreciate that there are many different ways to accurately identify the sites of a nucleic acid hybridization array at which cryptograph strands are hybridized. For example, the cryptograph strands can be chemically labeled with a radioisotope such as $P^{32}$, and the array sites at which cryptograph strands are hybridized can be detected by autoradiography; or the cryptograph strands can be conjugated to one or more fluorescent chemical groups which emit light and reveal the sites at which cryptograph strands are hybridized when the array is illuminated with ultraviolet light (Marshall et al., Nature Biotechnology, 1998, Vol. 16, pages 28–30; McGall et al., U.S. Pat. No. 5,412,087, col. 10, line 39, to col. 11, line 12; Heller et al., U.S. Pat. No. 5,605,662, col. 24, line 62 to col. 25, line 14). The array can be exposed to a DNA dye such as ethidium bromide, which is fluorescent when it is intercalated into DNA, and which intercalates into double-stranded DNA at the array sites comprising cryptograph strands with greater affinity than it binds to the single-stranded oligomers of the other sites (Heller et al., U.S. Pat. No. 5,605,662, Example 4 in col. 25–26). Recently developed methods employing mass spectrometry can also be used to identify array sites at which cryptograph strands are hybridized (for example, see Marshall et al., Nature Biotechnology, 1998, Vol. 16, pages 30–31; Ross et al., Nature Biotechnology 16, pp. 1347–1351, 1998; Laker et al., Nature Biotechnology 16, pp. 1352–1356, 1998). As discussed above, the array sites at which cryptograph strands are hybridized can also be identified by using such methods to detect signal oligomers that comprise distinctive detectable structures or chemical moieties, and that hybridize specifically to array-bound cryptograph strands, or to bridging oligomers that are linked to array-bound cryptograph strands.

Decryption

Decryption of the information encrypted according to the present invention comprises all of the steps involved in identifying the subunit sequences of the cryptograph strands that represent the encrypted information, and recovering the text, data, images, or other information which they represent. Accordingly, decryption can comprise isolating nucleic acids comprising the cryptograph strands from a transmitted virus or cell, obtaining and using a restriction enzyme to release cryptograph strands from large nucleic acid molecules, locating concealed cryptograph strands on or in a transmitted article, obtaining primers and using them to amplify the cryptograph strands, obtaining and using hybridization probes, a nucleic acid hybridization array, or bridging and signal oligomers, to identify subunit sequences present in the cryptograph strands, or analyzing and determining the nucleotide sequences of the cryptograph strands. In order to enable a recipient to decrypt a communication that has been encrypted according to the present invention, a key for decryption which comprises all of the information, materials, and devices needed to detect and identify the cryptograph strands and recover the original information which they represent is provided to the intended recipient.

Alternative Cryptograph Molecules

Those skilled in the arts of biochemistry, molecular immunology, and other fields that give knowledge of structure-specific molecular recognition, appreciate that the concept of encrypting information in the form of one or more different types of cryptograph strands can also be implemented by using molecules other than nucleic acids or their analogs to represent the encrypted information, or to positively identify the molecules which represent the encrypted information. For example, information could be represented by a set of polypeptides having selected amino acid sequences, in which case decryption comprises positively identifying the polypeptides, e.g. with antibodies that specifically bind to the polypeptides. Alternatively, the information can be represented by a set of proteins having selected amino acid sequences, and decryption can be achieved using an array of sites at which are attached ligands which bind with high affinity and high specificity to the proteins representing the information. The ligands that bind to the proteins representing the information can be small molecule substrates, such as steroid hormones or sugars, or they can be nucleic acid ligands (for example, see Gold et al., U.S. Pat. No. 5,475,096, in entirety). Those skilled in the art recognize that other embodiments of the invention based on the abilities of many different type of macromolecules to specifically recognize ligands or other macromolecules or can also be implemented.

"Tagging" With Cryptograph Strands

The present invention also provides a method for tagging or labeling an article or entity with at least one nucleic acid or nucleic acid analog comprising a subunit sequence that represents information about the article or entity. For example, a chemical or pharmaceutical preparation can be tagged by adding to it a set of oligonucleotides comprising subunit sequences identifying the chemical composition, and date and location of manufacture, of the preparation. In another embodiment, a set of oligonucleotides having subunit sequences that represent an instruction manual, parts list, ownership record, serial number, or other information about a manufactured article can be attached to the article, e.g., in a sealed vial, to permit recovery of the information at a later date. Identifying oligonucleotides can also be used to tag a cell or a living organism. For example, a DNA molecule comprising a nucleotide sequence representing a particular corporation, inventor, or patent number, can be introduced into the genome of an organism, e.g., a recombinant bacteria, to permit identification of the organism.

EXAMPLES

Example 1

Figure 5:
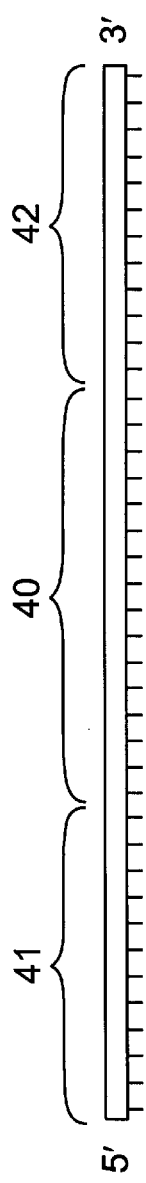
FIG. 5 schematically represents a cryptograph strand that is a 40-mer DNA oligonucleotide comprising a central 16-mer sequence (40) which represents encrypted information, and flanking 12-mer sequences (41 and 42) which operate as binding sites for PCR amplification primers.

Releasing a Set of Oligonucleotide Cryptograph Strands from an Oligomer-storing Device In this example, a set of selected oligonucleotide cryptograph strands comprising nucleotide sequences representing a message are released from an oligomer storage device. The cryptograph strands are 40-mer DNA oligonucleotides which comprise central 16-mer sequences ((40) in FIG. 5) which represent encrypted information, and which are complementary to oligomers attached to depot sites of the oligomer storage device. The cryptograph strands further comprise 12-mer sequences ((41 and 42) in FIG. 5) which are bound via phosphodiester linkages to each end of the central 16-mer sequences, and which operate as binding sites for PCR amplification primers.

Figure 6:
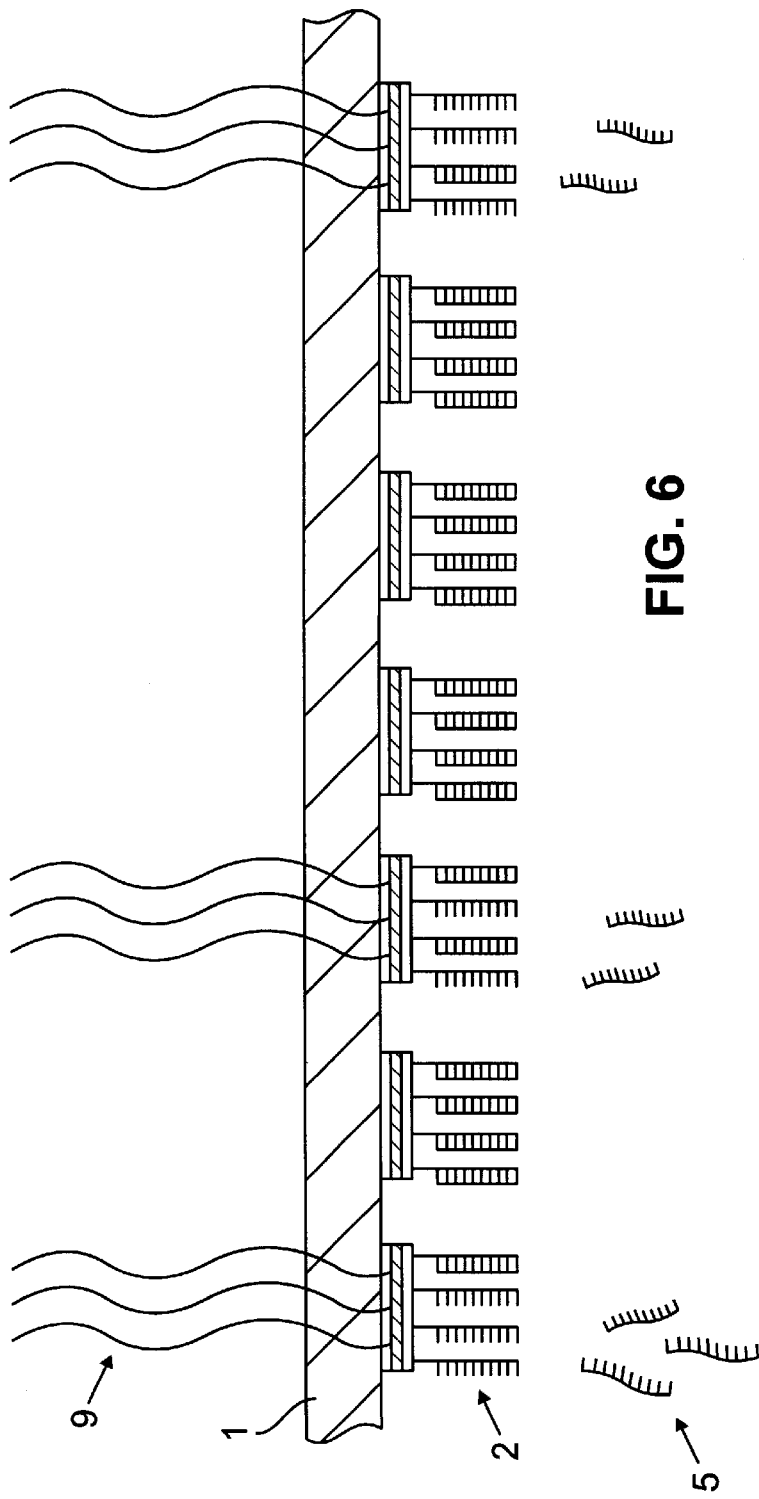
FIG. 6 schematically illustrate the release of DNA oligonucleotides (5) from selected depot sites (2) of an oligomer storage device.

The device that stores and releases the cryptograph strands comprises a 1 cm×1 cm wafer of crystalline $Al_2O_3$ substrate ((1) in FIG. 6) that supports a square micro-array of 165×165 depot pads. Wafers of crystalline $Al_2O_3$, "synthetic sapphire", which are suitable for use with the present invention can be obtained from Saphikon, Milford, N.H., 03055. The top surface of each depot pad is 50 _m×50 _m, and the depot pads are spaced 10 _m apart in both x and y directions in the array. Each depot pad comprises 3 layers, (1) a thermally insulating 1 _m thick layer of porous $SiO_2$ which is attached to the $Al_2O_3$ substrate, (2) a light-absorbing 0.5 _m thick layer of amorphous $SiO_2$, and (3) a top, 0.5 _m thick layer of $SiO_2$, to which oligomers having selected nucleotide sequences are attached ((2) in FIG. 6; see (10), (11), and (12) in FIG. 4) to produce a nucleic acid hybridization array. The attached oligomers are 16-mer DNA oligonucleotides (16 nucleotides in length) that are covalently attached at their 3' ends to uncharged spacer groups that are covalently attached to the upper $SiO_2$ surfaces of the depot pads. 40-mer DNA oligonucleotides comprising central 16-mer sequences which are complementary to the attached oligomers are stored in the depot sites by their being specifically hybridized to the attached oligomers by Watson-Crick base-pairing. The 12-mer sequences that are attached to each end of the central 16-mer sequences of the stored 40-mers do not hybridize to the oligomers attached to depot sites of the storage device; these 12-mer sequences operate as binding sites for primers used to amplify the 40-mers, as noted above. For clarity of illustration, FIG. 6 does not show the 12-mer sequences which are attached to each end of cryptograph strand 16-mer sequences representing the encrypted information.

The depot array is immersed in about 100 _l of solution containing 1 M NaCl, 5 mM EDTA, 0.1 M Tris-Cl, pH 8.0, 0.5% SDS, and each of the depot sites storing the selected oligonucleotides are irradiated through the $Al_2O_3$ substrate with approximately 100 milliwatts of argon laser light (488 nm) ((9) in FIG. 6) to melt double-stranded oligonucleotide complexes at the heated depots and release the desired single-stranded cryptograph strands into the solution ((5) in FIG. 6). The micro-array is washed and the cryptograph strands released by heating the selected depot sites are collected.

Example 2

Transmitting a Set of Cryptograph Strands.

One nanogram of an equimolar mixture of 1,000 different 40-mer oligonucleotide cryptograph strands which comprise subunit sequences that represent encrypted information, and flanking PCR amplification binding sites, as described in Example 1, is dissolved in a pint (473 ml) of sterile water. The water is sealed in a sterile bottle and is delivered by courier to the intended recipient. A nanogram of 40-mer oligonucleotides contains about $8 \times 10^{-14}$ mole of 40-mers, which is about 50 billion individual 40-mer molecules, so 10 _l of the solution delivered to the recipient contains about 1,000 copies of each of the 1,000 different cryptograph strands, which together represent the encrypted information.

Example 3

Amplifying the Cryptograph Strands

A vial containing a solution of 6.8 $\mu$M of each of a pair of 12-mer amplification primers dissolved in 20 $\mu$l of sterile water is provided to the recipient of the cryptograph strands of Example 2. One of the two 12-mer primers has the same nucleotide sequence as the 12 nucleotides at the 5' end of each of the cryptograph strands, and is conjugated at its 5' end to tetramethylrhodamine, which is a fluorescent signal moiety that absorbs ultraviolet light and emits yellow-orange light (Tyagi et al., Nature Biotechnology, 1998, Vol. 16, pages 49–53). The other 12-mer primer is complementary to the 12 nucleotides at the 3' end of each of the cryptograph strands. The cryptograph strands are amplified in a "standard" PCR amplification reaction (Saiki, in *PCR Technology, Principles and Applications for DNA Amplification*, Ed. by Erlich, Stockton Press, New York, N.Y., 1989, pp. 7–16). A 100 $\mu$l reaction mixture is prepared comprising 50 $\mu$M KCl, 10 mM Tris-HCl (pH 8.4 at room temperature), 1.5 mM $MgCl_2$, 100 $\mu$g/ml gelatin, 200 $\mu$M of each dideoxynucleotide triphosphate; 3.7 $\mu$l of the above-described primer solution giving 0.25 $\mu$M of each primer; 10 $\mu$l of the cryptograph strand mixture of Example 2, containing about 1,000 copies of each of the 1,000 different cryptograph strands, and 2.5 units of Taq polymerase. A thin layer of mineral oil is added to the top of the solution, and the mixture is subjected to 30 cycles of amplification in a DNA thermal cycler (Perkin-Elmer Applied Biosystems, Norwalk, Conn.).

Example 4

Identifying the Subunit Sequences of Cryptograph Strands

The recipient of the cryptograph strands is also provided with a micro-plate comprising a nucleic acid hybridization array like the one described in Example 1. The micro-plate comprises a micro-array of sites at which are attached single-stranded oligonucleotides comprising subunit sequences that are complimentary to the central 16-mer sequences of the cryptograph strands. This array has been exposed to denaturing conditions and stripped of all non-covalently attached oligomers, and is used to identify the central subunit sequences of the transmitted cryptograph strands that represent the encrypted information. The amplified cryptograph strands are denatured and allowed to hybridize to the "blank" micro-array under hybridization conditions of high stringency, i.e., under conditions in which central subunit sequences of the cryptograph strands hybridize specifically to the oligonucleotides attached to the array. Non-hybridized strands are washed off, and the array is illuminated with broad-wavelength ultraviolet light. The sites of the array at which cryptograph strands are specifically hybridized are identified by detecting the yellow-orange light emitted by the fluorescence of the tetramethylrhodamine groups that are conjugated to the cryptograph strands. Having identified the array sites at which the cryptograph strands hybridize, reference is made to the decryption key to recover the information represented by the central 16-mer subunit sequences of the hybridized cryptograph strands.

Example 5

Encrypting and Decrypting a Graphical Image

Figure 7:
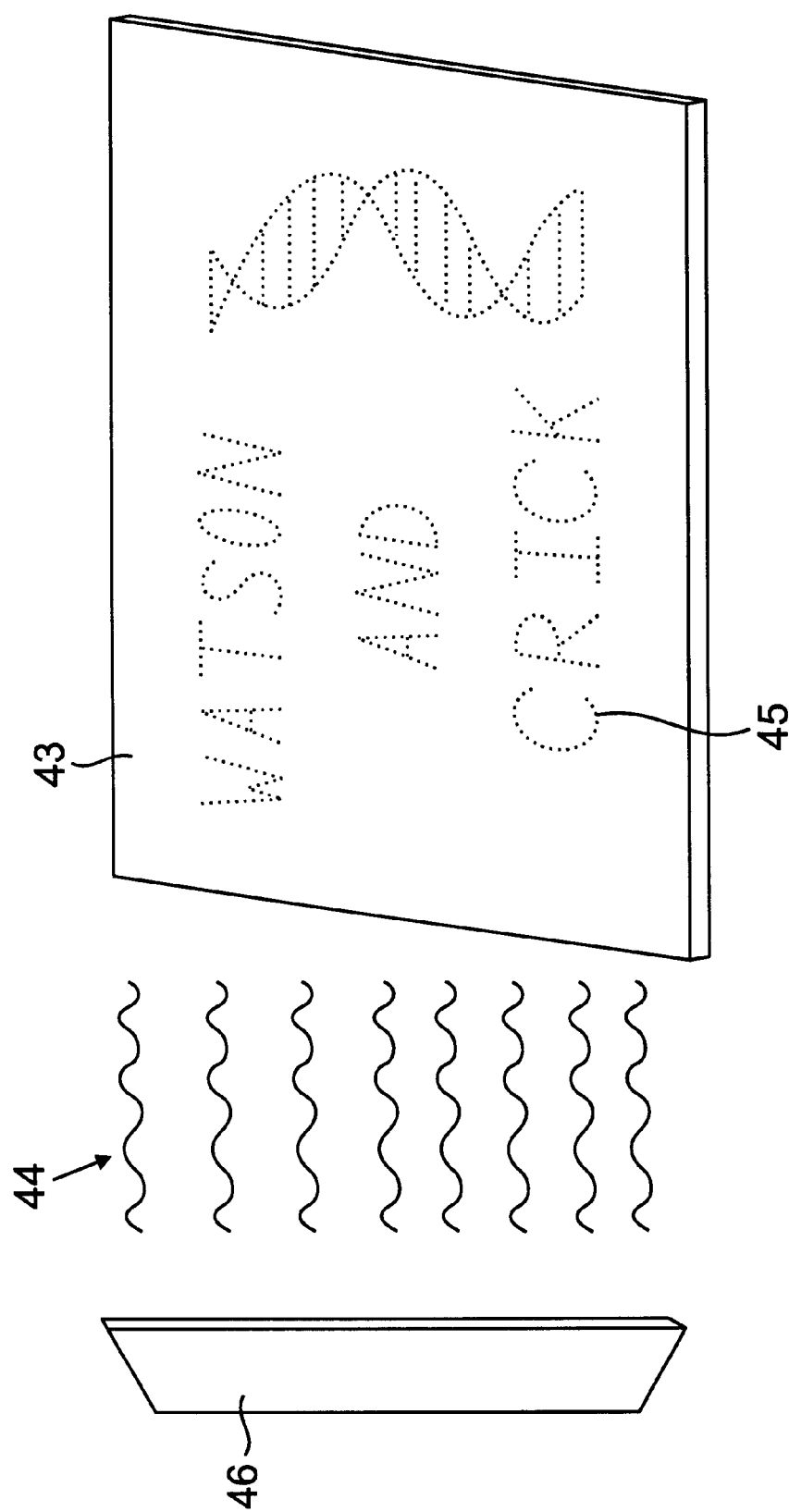
FIG. 7 schematically portrays a nucleic acid hybridization micro-array to which a set of fluorescent cryptograph strands representing an image are hybridized (43), and a source of broad-wavelength ultraviolet light (44) which illuminates the surface of the micro-array, causing the cryptograph strands to fluoresce and make visible the image (45) represented by the cryptograph strands.

In this example, the depot sites of an oligomer-storing micro-array have 1:1 correspondence to pixels in a pixel array that defines a graphical image. A set of cryptograph strands representing the image is obtained from the oligomer-storing array by locally heating the array sites at positions in the array corresponding to the pixels of the image, and collecting the released oligomers, as described for Example 1. This set of cryptograph strands is transmitted in a small vial to the recipient, is amplified as described in Example 3, and is specifically hybridized to a blank nucleic acid hybridization array comprising the same array of attached oligomers as the oligomer-storing array from which the cryptograph strands were obtained. Unhybridized cryptograph strands are washed from the micro-array, and the micro-array ((43) in FIG. 7) is illuminated with broad-wavelength ultraviolet light ((44) in FIG. 7), which causes the array sites at which the cryptograph strands are hybridized to fluoresce and the image to appear ((45) in FIG. 7).

All publications, patents, and patent applications mentioned in the above specification are incorporated herein by reference. Nothing herein is to be construed as an admission that the invention is not entitled to antedate such disclosure by virtue of prior invention. Various modifications and variations of the described methods and system of the invention will be apparent to those skilled in the art without departing from the scope and spirit of the invention. Although the invention has been described in connection with specific embodiments, it should be understood that the invention as claimed is not limited to such specific embodiments, and that various modifications of the described modes for carrying out the invention which are obvious to those skilled in the arts to which this invention pertains are intended to be within the scope of the following claims.

We claim:

1. A method for encrypting a graphical image, comprising obtaining from an oligomer-storing device, by locally heating an oligomer storage depot of the oligomer-storing device, at least one cryptograph strand that is a nucleic acid strand, or nucleic acid analog strand comprising a set of contiguous nucleotide or nucleotide analog subunits, the sequence of which represents a two-dimensional array of digital values that define a graphical image.

2. The method of claim 1, further comprising providing a key for decryption that permits the recovery of the graphical image.

3. The method of claim 2, further comprising transmitting the at least one cryptograph strand.

4. The method of claim 2, further comprising recovering the graphical image.

5. The method of claim 4, wherein the step of recovering the graphical image comprises identifying the sequences of subunits of said cryptograph strand that represent the color or gray-scale value, and the array position, of each pixel of the image represented by said at least one cryptograph strand.

6. The method of claim 5, wherein the step of identifying comprises allowing multiple copies of said cryptograph strand to hybridize specifically to a nucleic acid hybridization probe array having at least one array site at which are attached single-stranded oligomers comprising a subunit sequence that hybridizes specifically to a sequence of subunits of said at least one cryptograph strand;

and determining the position of the at least one site in the hybridization array at which said cryptograph strand specifically hybridizes.

7. The method of claim 6, wherein there is 1:1 positional correspondence between the digital values of the array that define the graphical image and the array sites of the nucleic acid hybridization array at which said cryptograph strands hybridize.

8. The method of claim 6, further comprising allowing said cryptograph strand to hybridize specifically to said oligomer attached to said at least one array site, and also to at least one signal oligomer comprising a detectable signaling moiety and a subunit sequence that hybridizes specifically to said at least one cryptograph strand; and detecting the position of the at least one array site at which said signal oligomer is hybridized.

9. A method for encrypting information comprising:

obtaining from an oligomer-storing device, by locally heating an oligomer storage depot of the oligomer-storing device, two or more different cryptograph strands that together represent a body of information selected from the group consisting of the letters of the alphabet, words, phrases of a language, punctuation marks, musical notation, the numbers 0–9, mathematical and other symbols, mathematical vectors, formulas, and matrices, and sets of digital values that define monochrome, gray-scale, or colored graphical images, wherein each of the different cryptograph strands is an oligonucleotide or oligonucleotide analog comprising a sequence of nucleotides or nucleotide analogs that represents a portion of the complete body of information, and further comprises a subunit sequence that identifies the relative position of the portion of the information represented by each of said cryptograph strands in the complete body of information.

10. The method of claim 9, wherein each cryptograph strand is an oligonucleotide or oligonucleotide analog of about 6 to 100 nucleotides or nucleotide analogs in length.

11. The method of claim 9, wherein each cryptograph strand is an oligonucleotide or oligonucleotide analog that comprises about 8 to about 50 nucleotides or nucleotide analogs that represent encrypted information.

12. The method of claim 11, wherein each cryptograph strand further comprises about 6 to 12 additional nucleotides or nucleotide analogs added at each end to permit amplification.

13. The method of claim 12, further comprising a step of amplifying the number of copies of the at least one cryptograph strand.

14. The method of claim 9, further comprising providing a key for decryption that permits recovery of the encrypted information.

15. The method of claim 14, further comprising transmitting the cryptograph strands.

16. The method of claim 15, comprising transmitting a solution in which the cryptograph strands are solutes.

17. The method of claim 15, comprising transmitting the cryptograph strands in dry form.

18. The method of claim 14, further comprising recovering the encrypted information by identifying the sequences of subunits of said cryptograph strands that represent the information string, and also identifying the relative position of the information represented by each of said cryptograph strands in the complete information string.

19. The method of claim 18, wherein the step of recovering the encrypted information comprises allowing multiple copies of the cryptograph strands to hybridize specifically to a nucleic acid hybridization array comprising an array of sites, at each of which are attached single-stranded oligomers comprising subunit sequences that hybridize specifically to subunit sequences of the cryptograph strands; and determining the positions of sites in the hybridization array at which the cryptograph strands specifically hybridize.

20. The method of claim 18 wherein the encrypted information is a two-dimensional array of digital values that defines a graphical image;

and the step of recovering the graphical image comprises identifying subunit sequences of the cryptograph strands that represent the color or gray-scale value, and the array position, of each pixel of the image represented by the cryptograph strands.

21. The method of claim 19, wherein the encrypted information is a two-dimensional array of digital values that defines a graphical image;

and there is 1:1 positional correspondence between the digital values of the array that defines the graphical image and the array sites of the nucleic acid hybridization array at which the cryptograph strands hybridize.

22. The method of claim 19, further comprising allowing the cryptograph strands to hybridize specifically to the oligomers attached to the array sites, and also to at least one signal oligomer comprising a detectable signaling moiety and a subunit sequence that hybridizes specifically to said cryptograph strands; and detecting the position of the array sites at which the signal oligomer hybridizes.

23. The method of claim 9, wherein the cryptograph strands are an oligonucleotide or an oligonucleotide analog.

24. The method of claim 9, wherein the cryptograph strands are present in a double-stranded nucleic acid.

25. The method of claim 19, further comprising:

providing one or more bridging oligomers, each of which comprises two sequences of subunits that hybridize specifically and independently to an oligomer attached to an array site of the hybridization array, or to a cryptograph strand, or to another bridging oligomer;

allowing the oligomers attached to the array, the cryptograph strands, and the bridging oligomers to hybridize specifically to each other;

and detecting the position of the at least one array site at which the cryptograph strands are hybridized.

26. The method of claim 19, further comprising:

providing one or more bridging oligomers, each of which comprises two sequences of subunits that hybridize specifically and independently to an oligomer attached to an array site of the hybridization array, or to a cryptograph strand, or to another bridging oligomer, or to a signal oligomer;

providing at least one signal oligomer that comprises a detectable signaling moiety and a subunit sequence that hybridizes specifically to a bridging oligomer or to a cryptograph strand; and allowing the oligomers attached to the array, the cryptograph strands, the bridging oligomers, and the signal oligomer to hybridize specifically to each other, and detecting the position of the array sites at which the signal oligomer hybridizes.

27. A method for encrypting information, comprising:

releasing an oligomer that represents encrypted information from an oligomer-storing device by locally heating an oligomer storage depot of the oligomer-storing device;

the oligomer-storing device comprising a substrate that supports an array of oligomer storage depots, at each of which is attached a plurality of oligomers having a- known subunit sequence, said oligomers being oligonucleotides and/or oligonucleotide analogs;

the oligomer that represents encrypted information being stored by being hybridized to complementary oligomers that are attached to at least one of the depots of the oligomer-storing device, and being released by locally heating the depot at which it is hybridized to denature double-stranded complexes of said depot and release stored oligomers without effecting significant denaturation of double-stranded complexes of unselected depots of the array; and obtaining at least one cryptograph strand that is a nucleic acid strand or nucleic acid analog strand comprising a set of contiguous nucleotide or nucleotide analog subunits, the sequence of which represents one or more phrases, words, alphanumeric characters, or other symbols, and/or one or more digital values, and/or one or more pixels that define a graphical image, which at least one cryptograph strand comprises the oligomer that represents encrypted information that was released from the oligomer-storing device.

\* \* \* \* \*